United States Patent [19]

Eynon

[11] 3,763,904
[45] Oct. 9, 1973

[54] LIMBING HEAD
[76] Inventor: John E. Eynon, 103 Sunset Bay, Port Arthur, Ontario, Canada
[22] Filed: Sept. 15, 1971
[21] Appl. No.: 180,721

[30] Foreign Application Priority Data
Sept. 22, 1970 Canada .............................. 093729

[52] U.S. Cl. ............................................... 144/2 Z
[51] Int. Cl. ............................................ A01g 23/00
[58] Field of Search ................ 144/2 Z, 3 D, 34 R, 144/309 AC

[56] References Cited
UNITED STATES PATENTS
3,308,861 3/1967 Hamilton ............................ 144/2 Z Primary Examiner—Gerald A. Dost
Attorney—Stevens, Davis, Miller & Mosher

[57] ABSTRACT

A limbing head for removing limbs from a tree includes a body and a pair of curved limbing arms, each pivotally secured to the body at laterally spaced positions for receiving a tree between the arms. Means for pivoting a first arm towards and away from the second arm are provided, together with means connecting the second arm to the first arm to cause the second arm to pivot simultaneously with the first arm towards and away from the first arm.

7 Claims, 9 Drawing Figures

3,763,904

LIMBING HEAD

This invention relates to limbing heads for removing limbs from trees.

In the logging industry, it is common practice to remove limbs from trees by the use of a limbing head which surrounds a tree and is moved relative to the tree to remove the limbs. The limbing head may be moved along the tree either before or after it is felled. It is also possible for the limbing head to remain stationary, in the case of a felled tree, while the tree is pulled through it.

Since the diameter of a tree usually decreases from one end to the other, the various parts of the limbing head surrounding the tree should be readily adjustable so as to closely surround the tree at all times during relative movement between the tree and the limbing head. It is therefore an object of this invention to provide a limbing head which is readily adjustable in this manner.

According to the invention, a limbing head has a body and a pair of curved limbing arms, each of the arms being pivotally secured to the body at laterally spaced positions. The first arm is pivotable towards and away from the second arm, and the second arm is connected to the first arm in such a manner that the second arm pivots simultaneously with the first arm towards and away from the first arm.

The first arm may be pivoted by a piston and cylinder jack, and the second arm may be connected to the first arm by intermeshing gears.

Also, the second arm may be pivotable independently of the first arm to a suitable position for discharging a tree from the limbing head.

Figure 1:
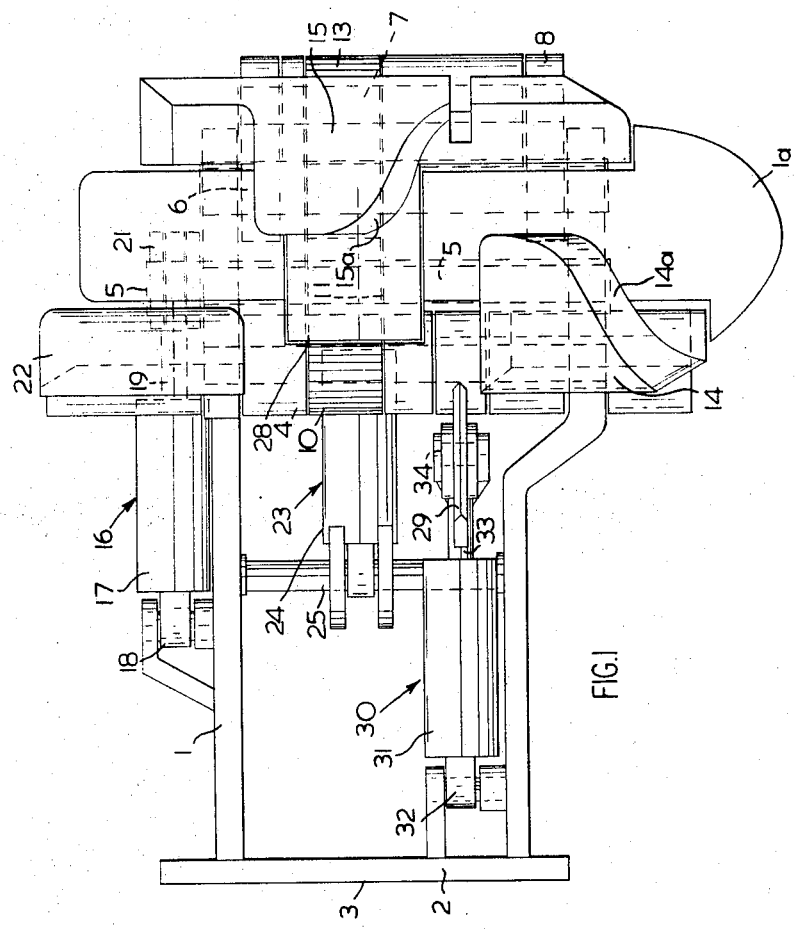
Figure 2:
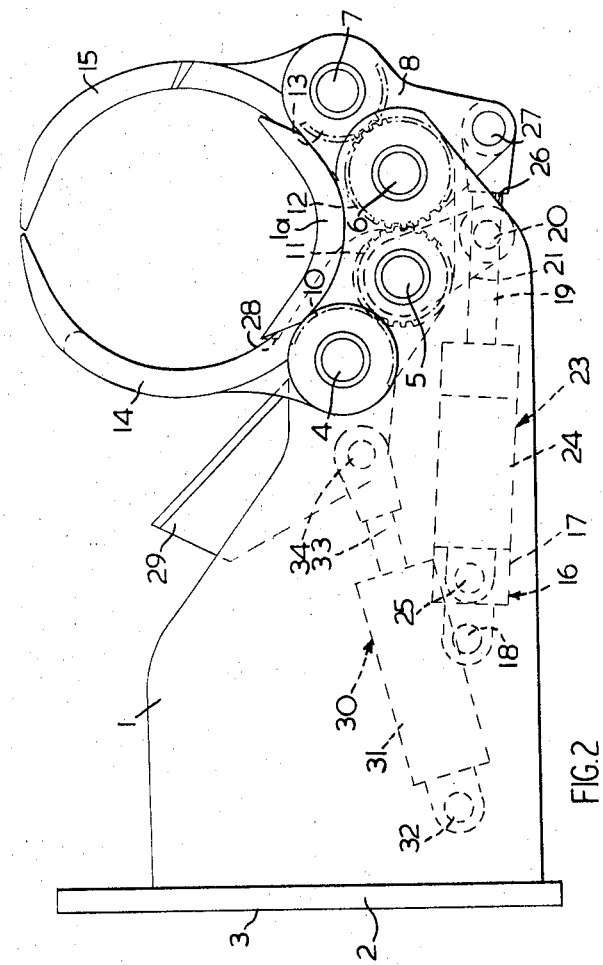
Figure 3:
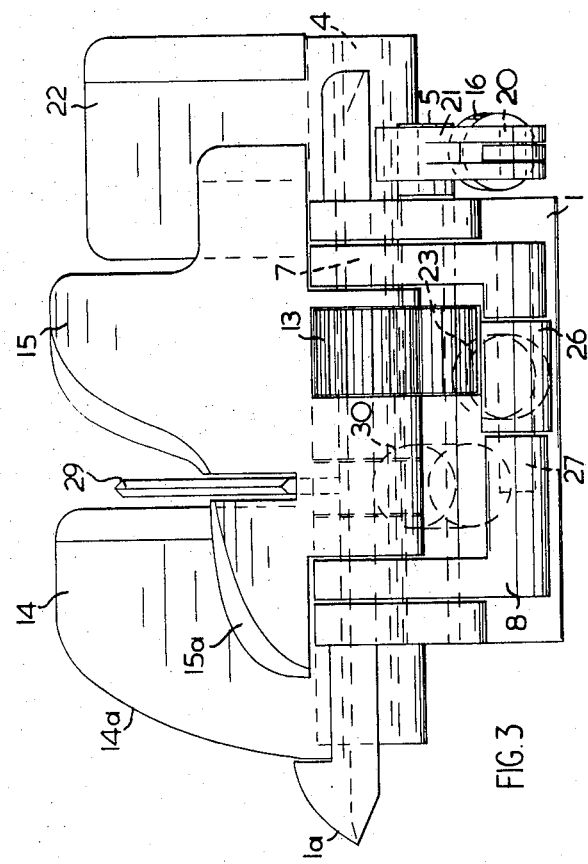
Figure 4:
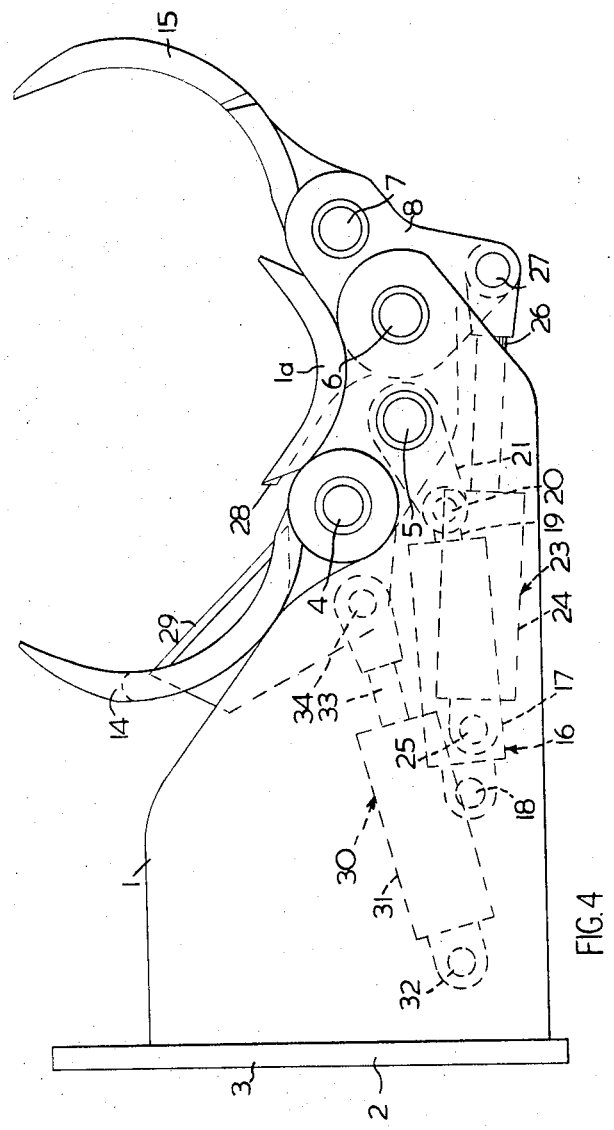
Figure 5:
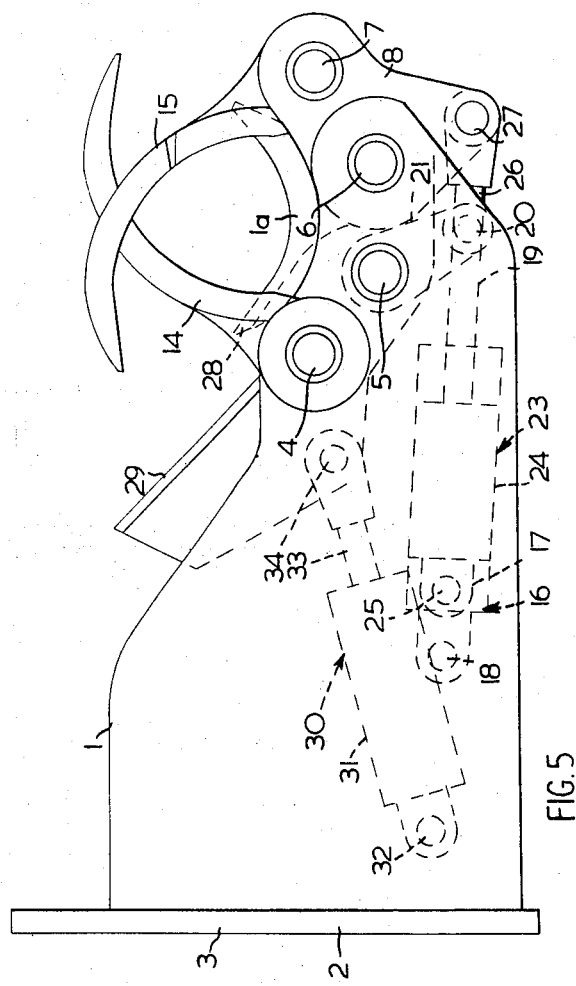
Figure 6:
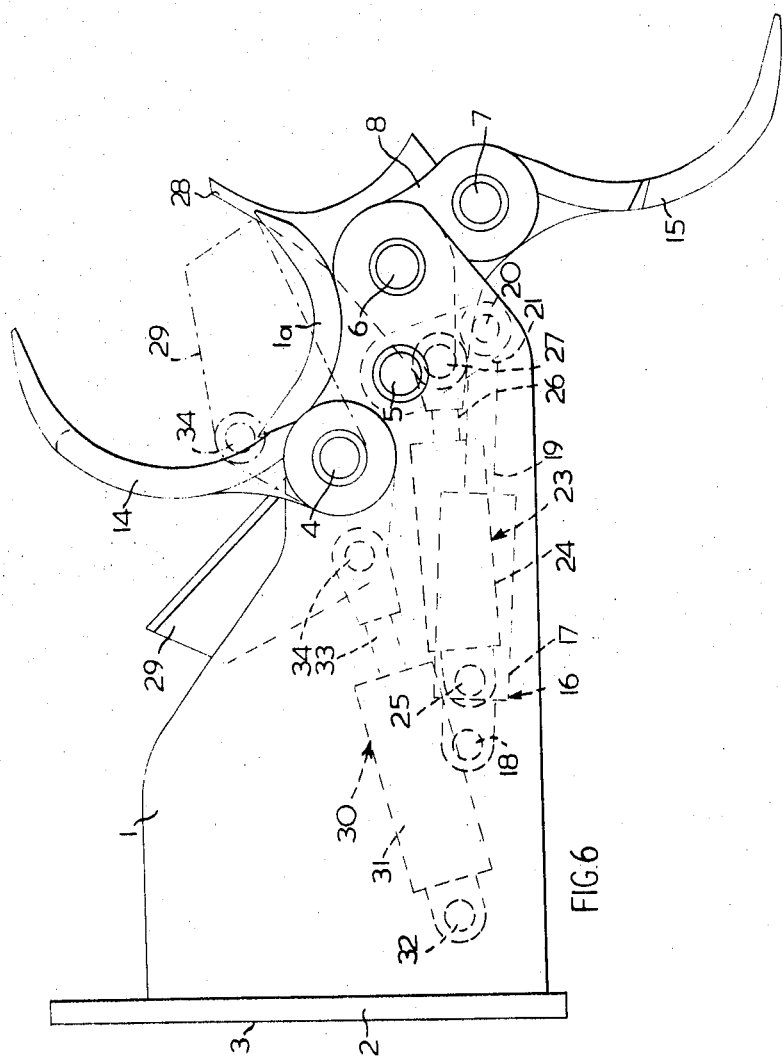
Figure 7:
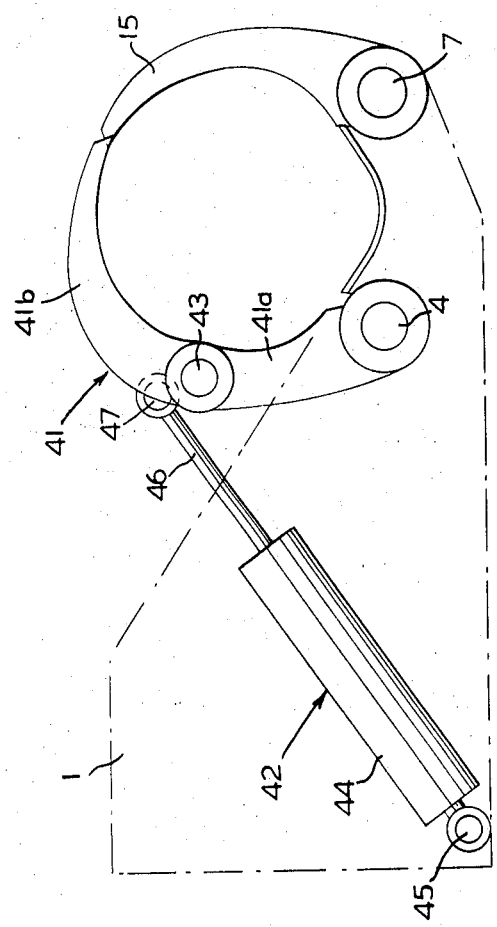
Figure 8:
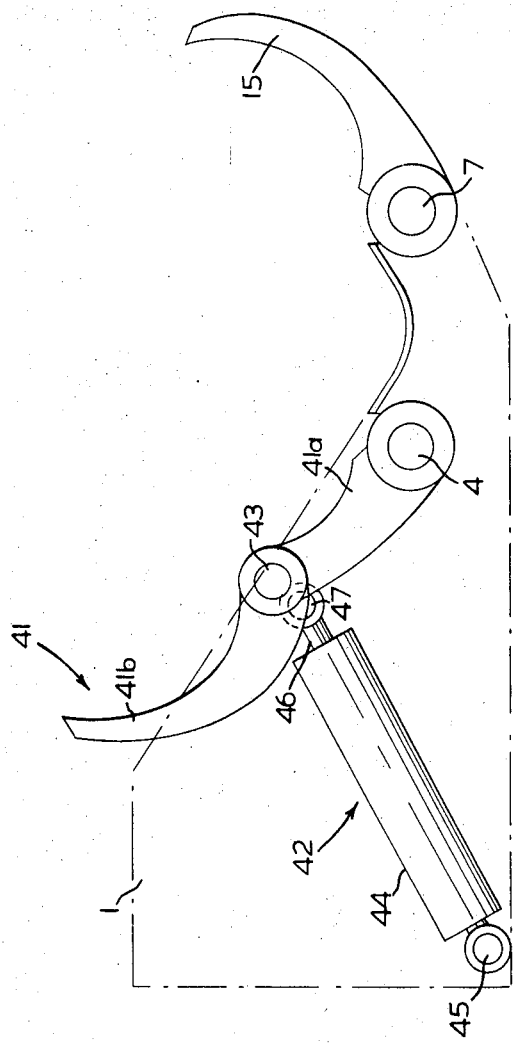
Figure 9:
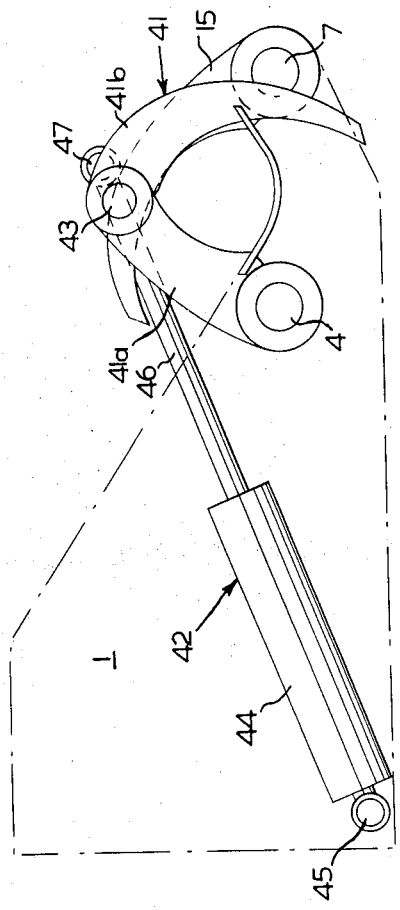

Embodiments of the present invention will now be described, by way of example, with reference to the accompanying drawings, of which, FIG. 1 is a plan view of a limbing head according to one embodiment, showing the arms in a partly closed position, FIG. 2 is an end view of the limbing head of FIG. 1, FIG. 3 is a side view of the limbing head of FIG. 1, FIG. 4 is an end view similar to FIG. 2, but showing the arms in the open log-receiving position, FIG. 5 is a similar view but showing the arms in a nearly closed position, FIG. 6 is a similar view showing the outer arm in a log-discharging position, and FIGS. 7 to 9 are similar to FIGS. 2, 4 and 5, but showing a second embodiment of the invention.

Referring first to FIGS. 1 to 6 of the drawings, a limbing head includes a body 1 secured to a support 2, which may be for example, the limbing boom assembly of the logging machine described in our Canadian Pat. No. 835,144 issued Feb. 24, 1970 and entitled "Feller-Limber-Buncher Logging Machine." The body 1 may be rotatably mounted on a shaft 3 carried by the support 2 such that the limbing head can be rotated on the shaft 3 relative to the support 2 by a hydraulic jack (not shown) connected between the body 1 and the support 2.

The body 1 carries three parallel shafts 4, 5, 6 each rotatably mounted in the body. A fourth shaft 7, parallel to the shafts 4, 5, 6, is rotatably mounted in a bracket 8 rotatably mounted on shaft 6. Each shaft 4 to 7 has a gear 10, 11, 12, 13 respectively secured thereto, the gear 10 meshing with the gear 11, which in turn meshes with the gear 12, which in turn meshes with the gear 13.

The shaft 4 carries a laterally inner curved limbing arm 14 which is rigidly secured to the shaft 4. Similarly, the shaft carries a laterally outer curved limbing arm 15 which is rigidly secured to the shaft 7. The limbing arms 14, 15 are curved upwardly and towards each other in end view, as shown in FIG. 2 although, as shown in FIG. 1, they are actually axially displaced from each other in a direction parallel to the shafts 4, 7. Each limbing arm 14, 15 has a sharpened leading edge 14a, 15a respectively, and an adjacent portion of the body has a sharpened leading edge 1a.

A first hydraulic jack 16 has its cylinder 17 pivotally secured to the body 1 by a pin 18 and its piston rod 19 pivotally secured by a pin 20 to a crank 21 secured to shaft 5. Contraction of the jack 16 causes rotation of the gear 5, which in turn causes rotation of gear 4 and gears 6, 7 such that the two arms 14, 15 move outwardly from the positions shown in FIG. 2 to the positions shown in FIG. 4. The rear end of the shaft 4 carries a guide arm 22 which is aligned and moves with the limbing arm 14.

A second hydraulic jack 23 has its cylinder 24 pivotally secured by a pin 25 to the body 1 and its piston rod 26 pivotally secured by a pin 27 to a lower part of the bracket 8. Contraction of the jack 23 causes the bracket 8 to rotate in a clockwise direction from the positions shown in FIG. 2 to the positions shown in FIG. 6. During this rotation, the gear 13 rotates by reason of its engagement with gear 12, which is stationary at this time. Thus the shaft 7 moves angularly relative to the shaft 6 and also moves angularly about its own axis, with the result that the outer arm 15 moves through a large angle to the positions shown in FIG. 6. A log can then fall sideways out of the limbing head. A plate 28 integral with the outer arm 15 but on the opposite side of shaft 7 thereto normally lies below the upper surface of the body 1 between the arms 14, 15. When the outer arm 15 is moved to the positions shown in FIG. 6, the plate 28 undergoes an equivalent movement and rises up from the body 1 to force a log sideways out of the limbing head.

A topping shear blade 29 is pivotally mounted on the shaft 4 at a position immediately to the rear of the inner arm 14. The shear 29 is actuated by a third hydraulic jack 30 having a cylinder 31 pivotally connected to the body 1 by a pin 32 and a piston rod 33 pivotally connected to the shear blade 29 by a pin 34. Extension of jack 30 causes the shear blade 29 to pivot about shaft 4 to a position between arms 14, 15, thereby cutting through a log therein.

To remove the limbs from a tree, the limbing head is initially set with jack 16 contracted to position the arms 14, 15 in the open position shown in FIG. 4. Jack 23 is in its extended position, and jack 30 is in its contracted position. The limbing head is then positioned underneath the tree near its base end, so that the part of the body 1 between the arms 14, 15 engages the underside of the tree. Jack 16 is then extended to cause the arms 14, 15 to move to the positions shown in FIG. 2 and engage the tree. It will be noted that the base 1 and the arms 14, 15 form a substantially circular shape completely surrounding the tree. With jack 16 still pressurised in the extending sense, the limbing head is moved along the tree, for example by the limbing boom assembly described in the previously mentioned patent application. The sharpened edges 1a, 14a, 15a remove the limbs from the tree, and the pressurisation of the jack 16 causes the arms 14, 15 to move inwardly to continually closely surround the tree as its diameter decreases.

When the limbing head nears the top of the tree, the jack 30 is actuated to cause the shear blade 29 to cut off the top portion of the tree, and is then contracted to return the blade 29 to its original position. The arms 14, 15 are disengaged from the tree to a small extent by an appropriate contraction of the jack 16, and the limbing head is then moved rearwardly to an approximately mid-position along the tree. The jack 16 is extended to cause arms 14, 15 to then tightly engage the tree so that the tree can be transported by movement of the limbing head to a convenient location. The jack 23 is then contracted to move the arm 15 and plate 28 to the positions shown in FIG. 6, thereby discharging the log from the limbing head.

FIGS. 7 to 9 show a second embodiment in which the arm 14 and jack 16 have been replaced by a two part arm 41 and a jack 42. The arm 41 has a first portion 41a pivotally connected at one end to the body 1, and a second portion 41b pivotally connected at one end by a pin 43 to the opposite end of the first portion 41a. The jack 42 has its cylinder 44 pivotally secured to the body 1 by a pin 45 and its piston rod 46 pivotally secured by a pin 47 to the second arm portion 41b adjacent the pin 43.

Extension and contraction of the jack 16 operates the arm 41 in the manner illustrated, and motion of the arm 41 is transmitted through the previously described gears to the arm 15.

I claim:

1. A limbing head for removing limbs from a tree, including a body and a pair of curved limbing arms, each pivotally secured to the body at laterally spaced positions for receiving a tree between said arms, each limbing arm being curved about an axis parallel to the length of the tree and having a leading edge shaped to remove limbs from the tree upon longitudinal relative movement between the limbing head and the tree, means for pivoting a first arm towards and away from the second arm, and gear means connecting the second arm to the first arm to cause the second arm to pivot simultaneously with the first arm towards and away from the first arm.

2. A limbing head according to claim 1 including means for pivoting the second arm, independently of the first arm, to a log-discharging position.

3. A limbing head according to claim 1 wherein said connecting means includes a first rotatable gear secured to the first arm, and a second rotatable gear secured to the second arm.

4. A limbing head according to claim 3 wherein said pivoting means includes a piston and cylinder jack operable to cause rotation of said gears.

5. A limbing head according to claim 3 wherein said connecting means includes a further rotatable gear between the first and second gears and meshing with the second gear.

6. A limbing head according to claim 5 wherein said second arm and second gear are mounted on a bracket, said bracket being mounted for rotation about the axis of rotation of said further gear, and including means for rotating the bracket about the rotational axis of the further gear to cause the second arm to pivot to a log-discharging position without movement of the first arm.

7. A limbing head according to claim 1 wherein the first and second arms are spaced from one another in a direction parallel to their axes of rotation.

* * * * *

UNITED STATES PATENT OFFICE
CERTIFICATE OF CORRECTION

Patent No. 3,763,904            Dated October 9, 1973

Inventor(s) JOHN E. EYNON

It is certified that error appears in the above-identified patent and that said Letters Patent are hereby corrected as shown below:
ON THE TITLE PAGE After the name of the inventor please insert -- Assignee: Abitibi Paper Company, Ltd., Toronto, Ontario, Canada -- .

Signed and sealed this 13th day of August 1974.

(SEAL)
Attest:

McCOY M. GIBSON, JR.
Attesting Officer

C. MARSHALL DANN
Commissioner of Patents